US012586826B2

(12) United States Patent
Kenney et al.

(10) Patent No.: US 12,586,826 B2
(45) Date of Patent: Mar. 24, 2026

(54) METHOD FOR OPERATING A METAL-HYDROGEN BATTERY

(71) Applicant: EnerVenue Holdings, Ltd., Fremont, CA (US)

(72) Inventors: Michael J. Kenney, San Francisco, CA (US); Jingyi Zhu, San Jose, CA (US); Ge Zu, San Jose, CA (US); Yingying Wu, Sunnyvale, CA (US); Majid Keshavarz, Pleasanton, CA (US)

(73) Assignee: EnerVenue Holdings, Ltd., Fremont, CA (US)

( * ) Notice: Subject to any disclaimer, the term of this patent is extended or adjusted under 35 U.S.C. 154(b) by 600 days.

(21) Appl. No.: 18/053,882

(22) Filed: Nov. 9, 2022

(65) Prior Publication Data

US 2023/0141687 A1      May 11, 2023

Related U.S. Application Data

(60) Provisional application No. 63/278,046, filed on Nov. 10, 2021.

(51) Int. Cl.
H01M 10/42      (2006.01)
H01M 10/44      (2006.01)
H01M 12/08      (2006.01)

(52) U.S. Cl.
CPC ....... H01M 10/4242 (2013.01); H01M 10/44 (2013.01); H01M 12/08 (2013.01)

(58) Field of Classification Search
CPC .. H01M 10/4242; H01M 10/44; H01M 12/02; H01M 12/08; H01M 2004/028; H01M 4/8615; H01M 4/8621; H01M 4/9041; Y02E 60/10
See application file for complete search history.

(56) References Cited

U.S. PATENT DOCUMENTS

| | | | | | |
|---|---|---|---|---|---|
| 2002/0146617 A1* | 10/2002 | Johnson | .................... | H02J 7/35 | |
| | | | | 429/7 | |
| 2010/0304206 A1* | 12/2010 | Nakashima | ....... | H01M 10/0525 | |
| | | | | 29/623.1 | |

FOREIGN PATENT DOCUMENTS

| | | |
|---|---|---|
| CN | 113249737 A | 8/2021 |
| JP | 409107604 A | 4/1997 |
| JP | 2000299137 A | 10/2000 |
| JP | 2004319366 A | 11/2004 |
| WO | 2019032704 A | 2/2019 |

OTHER PUBLICATIONS

Machine translation JPH09107604A (Year: 1997).*
International Search Report and Written Opinion for PCT/US2022/079614, dated Mar. 1, 2023, 9 pages.
(Continued)

*Primary Examiner* — Victoria H Lynch
(74) *Attorney, Agent, or Firm* — Haynes and Boone LLP

(57)      ABSTRACT

A method for operating a metal-hydrogen battery includes monitoring an indicator of degeneration of the metal-hydrogen battery during normal cycles of discharge and charge; determining whether the energy efficiency of the metal-hydrogen battery during normal cycles of discharge and charge is decayed based on the indicator; and in response to determining that the metal-hydrogen battery during normal cycles of discharge and charge is decayed due to oxidation, regenerating the metal-hydrogen battery.

22 Claims, 12 Drawing Sheets

(56) References Cited

OTHER PUBLICATIONS

Oman et al., "Hubble Space Telescope at Twelve Years of Age", IEEE AESS Systems Magazine, Jan. 2003, pp. 31-36.
Office Action for JP Patent App 2024-519685, dated Mar. 12, 2025, 3 pages.
Office Action for EP 228232653.8, dated Sep. 5, 2025, 6 pages.

* cited by examiner

METHOD FOR OPERATING A METAL-HYDROGEN BATTERY

RELATED APPLICATION

This disclosure claims priority to U.S. Provisional Application Ser. No. 63/278,046, filed on Nov. 10, 2021, which is herein incorporated by reference in its entirety.

TECHNICAL FIELD

This disclosure is generally related to operating metal-hydrogen batteries, and more particularly to methods that include regenerating decayed metal-hydrogen batteries.

BACKGROUND

For renewable energy resources such as wind and solar to be competitive with traditional fossil fuels, large-scale energy storage systems are needed to mitigate their intrinsic intermittency. To build a large-scale energy storage, the cost and long-term lifetime are the utmost considerations. Currently, pumped-hydroelectric storage dominates the grid energy storage market because it is an inexpensive way to store large quantities of energy over a long period of time (about 50 years), but it is constrained by the lack of suitable sites and the environmental footprint. Other technologies such as compressed air and flywheel energy storage show some different advantages, but their relatively low efficiency and high cost should be significantly improved for grid storage. Rechargeable batteries offer great opportunities to target low-cost, high capacity and highly reliable systems for large-scale energy storage. Improving reliability of rechargeable batteries has become an important issue to realize a large-scale energy storage.

Consequently, there is a need for methods of operating a metal-hydrogen battery.

SUMMARY

Described herein are methods for operating metal-hydrogen batteries to improve their reliability. Particularly, the method disclosed herein can regenerate decayed metal-hydrogen batteries to improve their performance and prolong their lives. In particular, a method for operating a metal-hydrogen battery includes monitoring operation of the metal-hydrogen battery during normal cycles of discharge and charge; determining whether the anode of the metal-hydrogen battery during normal cycles of discharge and charge is degraded based on an indicator monitored during operation; and in response to determining that the anode is degraded, regenerating the metal-hydrogen battery. In some embodiments, regenerating the metal-hydrogen battery includes applying reconditioning cycles of discharge and charge to the metal-hydrogen battery, wherein the reconditioning cycles of discharge and charge utilize a discharge or charge condition different from normal cycles of discharge and charge. In some embodiments regenerating the metal-hydrogen battery includes increasing a cutoff voltage to a predetermined voltage during discharge operations subsequent to the cycles of discharge and charge.

In some embodiments, a metal-hydrogen battery includes a vessel; at least one cell comprising a cathode and an anode, the anode and the cathode each having a catalyst, the at least one cell contained within the vessel, the at least one cell supporting a hydrogen evolution reaction (HER) and a hydrogen oxidation reaction (HOR) during charge and discharge cycles; an electrolyte contained in the vessel; and a controller coupled to the at least one cell, the controller executing instructions to monitor an indicator during operation of the metal-hydrogen battery during normal cycles of discharge and charge; determine whether the anode of the metal-hydrogen battery during normal cycles of discharge and charge is degraded based on the indicator; and in response to determining that anode of the metal-hydrogen battery during normal cycles of discharge and charge is degraded, regenerate the metal-hydrogen battery.

Other embodiments are contemplated and explained herein after.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the disclosure are utilized, and the accompanying drawings of which:

DETAILED DESCRIPTION

Figure 1A:
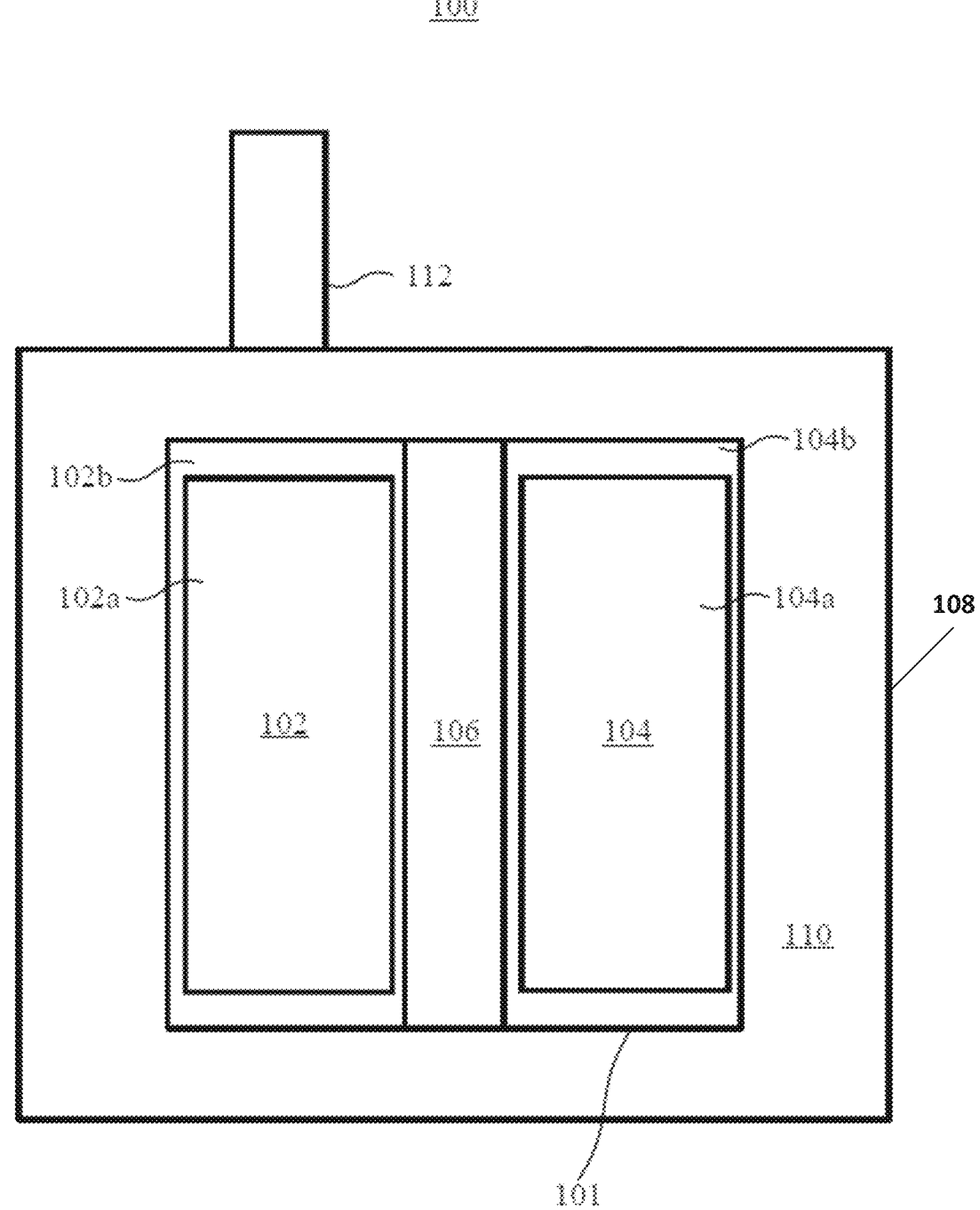
FIG. 1A depicts a schematic of a metal-hydrogen battery cell according to some embodiments.

In the following description, certain specific details are set forth in order to provide a thorough understanding of various embodiments of the disclosure. However, one skilled in the art will understand that the disclosure may be practiced without these details. Moreover, while various embodiments of the disclosure are disclosed herein, many adaptations and modifications may be made within the scope of the disclosure in accordance with the common general knowledge of those skilled in this art. Such modifications include the substitution of known equivalents for any aspect of the disclosure in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

To expedite both hydrogen evolution (HER) and hydrogen oxidation (HOR) reactions, the anode of the metal-hydrogen battery according to aspects of the present disclosure are transition metal anode (TMA) that includes a TMA catalyst that includes both metal sites to bind with hydrogen and metal oxide/metal hydroxide to being with hydroxide anions. The interfaces between metal and metal oxide are highly active for both HER and HOR and an optimal ratio of metal to metal-oxide is maintained to achieve high catalyst activity. Although, with TMA catalysts as described below, a significant self-healing mechanism occurs during normal operational cycling of the battery, oxidation may continue to occur on the TMA that eventually results in degradation of the anode. Aspects of the present invention monitor operation of the metal-hydrogen oxide to detect degradation of the anode and regeneration steps are taken when particular levels of degradation are detected.

Consequently, in accordance with some aspects of the present disclosure, an indicator of degradation of the metal-hydrogen battery during normal cycles of discharge and charge is monitored and it is determined whether threshold levels of degradation of the metal-hydrogen battery during the normal cycles of discharge and charge is detected based on the indicator. In response, if it is determined that the battery has degenerated due to anode oxidation, a regeneration procedure for the metal hydrogen battery is performed. In some embodiments, the regeneration procedure includes applying reconditioning cycles of discharge and charge to the metal-hydrogen battery. The reconditioning cycles of discharge and charge utilize a discharge or charge condition different from normal cycles of discharge and charge. In some embodiments, the regeneration procedure includes increasing a cutoff voltage to a predetermined voltage during discharge operations subsequent to the cycles of discharge and charge. Determination of the decay can be performed by monitoring the rates of decays, monitoring an anode voltage, or by using an AI based system.

FIG. 1A depicts a schematic of a metal-hydrogen battery 100 according to some embodiments. The metal-hydrogen battery 100 includes cell 101 that includes a cathode 102, an anode 104, and a separator 106 disposed between the cathode 102 and the anode 104. The cell 101 is housed in an enclosure 108. An electrolyte 110 is saturated among cathode, anode and separator. The cathode 102, the anode 104, and the separator 106 are porous to allow the electrolyte 110 to communicate between the cathode 102 and the anode 104. In some embodiments, the separator 106 can be omitted as long as the cathode 102 and the anode 104 can be isolated from each other. For example, the space occupied by the separator 106 may be filled with the electrolyte 110. The metal-hydrogen battery 100 further includes an inlet 112 configured to introduce certain amount of electrolyte into the enclosure 108. Inlet 112 may include a valve or may otherwise be sealed after enclosure 108 is filled before operation of battery 100. As is further discussed below, battery 100 is charged and discharged through a hydrogen evolution reaction (HER) and a hydrogen oxidation reaction (HOR).

Figure 1B:
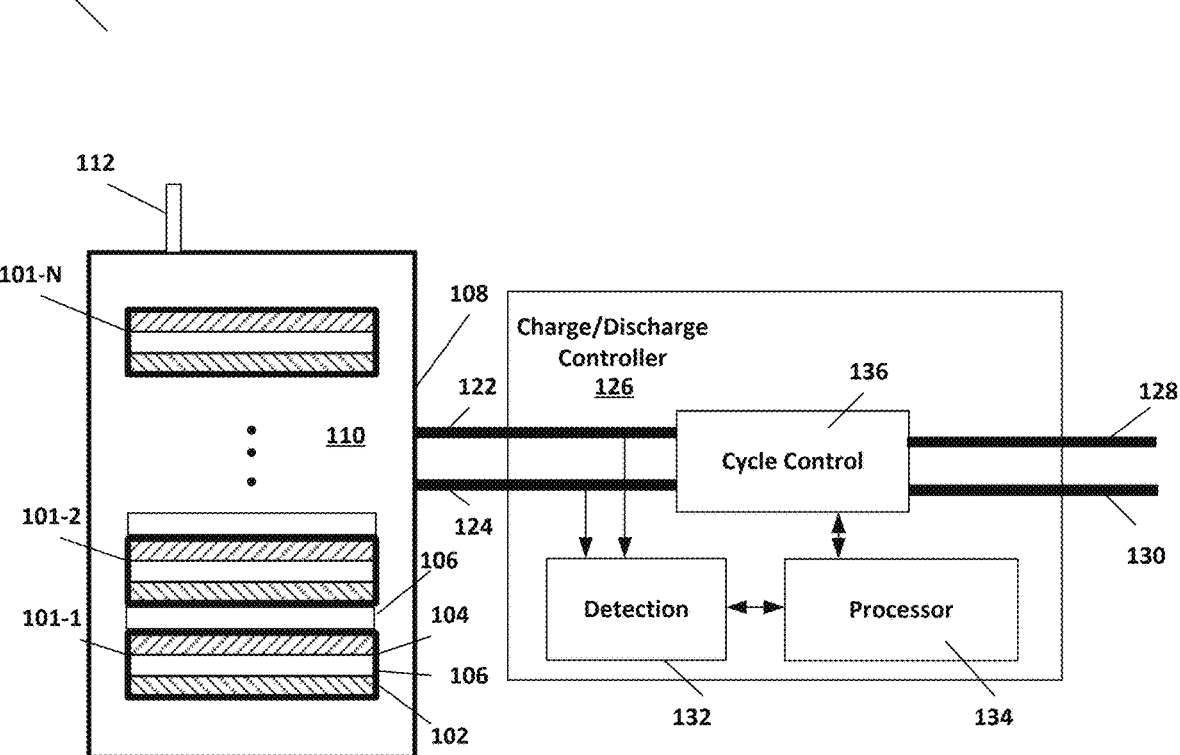
FIG. 1B depicts a schematic of a metal-hydrogen battery according to some embodiments.

FIG. 1B illustrates a battery arrangement according to some embodiments of this disclosure. As illustrated in FIG. 1B, a number of cells 101-1 through 101-N are stacked within enclosure 108. Cells 101-1 through 101-N can be separated by another separator 106 and may be coupled either in parallel or in series. In this disclosure, the configuration where a number of cells 101 are coupled in parallel are discussed. Output terminals 122 and 124 are provided and coupled to the stack of cells 101-1 through 101-N to provide current in and out of battery enclosure 108 to cells 101-1 through 101-N.

Terminals 122 and 124 can be coupled to a charge/discharge controller 126. Charge/discharge controller 126 can control the current or voltage on terminals 122 and 124 as described in further detail below. Charge/discharge controller 126 can, in some embodiments, include a detection circuit 132 that monitors voltage and current on terminals 122 and 124. Detection circuit 132 can also be coupled to monitor temperature and pressure in vessel 108. Detection circuit 132 provides signals to a processor 134. Processor 134 includes a combination of microcontrollers, microprocessors, digital circuitry, ASICs or other circuitry to process the signals from detection circuit 132 and perform the functions described in further detail below. In some embodiments, processor 134 can include an AI processor that has been trained to perform functions as is described below. Processor 134 can provide signals to a cycle controller 136 that can control the HER/HOR cycling of battery 100 as is further described below. In particular, as described below, processor 134 provides signals to cycle controller 136 to switch from a normal cycle mode to a regeneration cycle mode as discussed further below.

As illustrated in FIG. 1A and discussed above, each cell 101 includes a cathode 102 and an anode 104 that are separated by a separator 106. Cell 101 is positioned in a vessel 108 where an electrolyte 110 can flow between cathode 102 and anode 104. As is discussed further below, cathode 102 is formed of a porous conductive substrate 102*a* coated by a porous active material 102*b*. Similarly, anode 104 is formed of a porous conductive substrate 104*a* coated by a porous catalyst 102*b*. In some embodiments, the electrolyte 108 is an aqueous electrolyte that is alkaline (with a pH greater than 7). Each of anode 104 and cathode 102 can be formed as electrode assemblies with multiply layered structures.

The hydrogen evolution reaction (HER) and hydrogen oxidation reaction (HOR) are more mechanistically complex in alkaline conditions than in acidic conditions. Active alkaline HER/HOR catalysts tend to have more dynamic surfaces. In acidic conditions, the reactions proceed via the reduction of $H^+$ to $H_2$ or the oxidation of $H_2$ to $H^+$. The activity of a catalyst for these reactions in acidic conditions can be closely correlated to the binding energy of hydrogen to the metal surface. If hydrogen binds too strongly or too weakly, the catalytic process cannot effectively proceed and the kinetic overpotential will be large. Platinum has an ideal binding energy for hydrogen and demonstrates better HER/ HOR performance than any other catalyst in low pH solutions. In alkaline conditions, the concentration of free $H^+$ is essentially zero, and thus the HER first proceeds via the cleavage of the H—O bond of a water molecule to generate a surface-adsorbed hydrogen atom and a hydroxide anion according to Eq. 1 below. This step is slow on metal surfaces, resulting in alkaline HER exchange current densities that are two to three orders of magnitude smaller than in acid on the same metal. Hydrogen gas is generated according to Eq. 2 or Eq. 3 below. This step (Eq. 1) occurs in reverse as the last step of HOR and is also rate determining as metal surfaces do not interact strongly with the hydroxide anions required to complete the reaction and form $H_2O$.

$$H_2O + M + e- \leftrightarrow MH_{ad} + OH^- \qquad \text{Eq. 1}$$

$$MH_{ad} + H_2O + e- \leftrightarrow M + H_2 + OH^- \qquad \text{Eq. 2}$$

$$MH_{ad} + MH_{ad} \leftrightarrow 2M + H_2 \qquad \text{Eq. 3}$$

To expedite both HER and HOR on the catalyst, a catalyst material is provided that contains (i) metal sites to bind with hydrogen and (ii) metal oxide/metal hydroxide sites to bind with hydroxide anions. The interfaces where metal and metal oxide meet are highly active for both HER and HOR and an optimal ratio of metal-to-metal oxide is maintained to achieve high catalyst activity. If the catalyst surface becomes too oxidized during prolonged, or high overpotential, HOR, the catalyst surface can become deactivated and the battery performance will decay as a result.

Accordingly, the anode 104 as illustrated in FIG. 1A is a catalytic hydrogen electrode. In some embodiments, as discussed above, the anode 104 includes a porous conductive substrate 104a and a catalyst layer 104b covering the porous conductive substrate 104a. Although it is illustrated in FIG. 1A that the catalyst layer 104b covers the outer surface of the porous conductive substrate 104a, it is to be understood that since the porous conductive substrate 104a has internal pores or interconnected channels (not shown), the catalyst layer 104b also covers the surfaces of those pores and channels. The catalyst layer 104b includes a bi-functional catalyst to catalyze both HER and HOR at the anode 104. In some embodiments, the porous conductive substrate 104a has a porosity of at least about 10%, at least about 20%, at least about 30%, at least about 40%, or at least about 50%, and up to about 80%, up to about 90%, up to about 95% or greater. In some embodiments, the porous conductive substrate 104a is a metal foam, such as a nickel foam, a copper foam, a steel foam, an aluminum foam, or others. In some embodiments, the porous conductive substrate 104a is a metal alloy foam, such as a nickel-molybdenum foam, a nickel-copper foam, a nickel-cobalt foam, a nickel-tungsten foam, a nickel-silver foam, a nickel-molybdenum-cobalt foam, or others. Other conductive substrates are encompassed by this disclosure, such as metal foils, metal meshes, and fibrous conductive substrates. In some embodiments, the conductive substrates are carbon-based materials, such as carbon fibrous paper, carbon cloth, carbon felt, carbon mat, carbon nanotube film, graphite foil, graphite foam, graphite mat, graphene foil, graphene fibers, graphene film, and graphene foam.

In some embodiments, the bi-functional catalyst of the catalyst layer 104b is a nickel-molybdenum-cobalt (Ni-MoCo) alloy. Other transition metal or metal alloys as bi-functional catalysts are encompassed by this disclosure, such as nickel, nickel-molybdenum, nickel-tungsten, nickel-tungsten-cobalt, nickel-carbon, nickel-chromium, based composites. In some embodiments, bi-functional catalyst is a transition metal alloy that includes two or more of Ni, Co, Cr, Mo, Fe, Mn and W. Other precious metals and their alloys as bi-functional catalysts are encompassed by this disclosure, such as platinum, palladium, iridium, gold, rhodium, ruthenium, rhenium, osmium, silver, and their alloys with precious and non-precious transition metals such as platinum, palladium, iridium, gold, rhodium, ruthenium, rhenium, osmium, silver, nickel, cobalt, manganese, iron, molybdenum, tungsten, chromium and so forth. In some embodiments, bi-functional catalysts are a combination of hydrogen evolution reaction and hydrogen oxidation reaction catalysts. In some embodiments, the bi-functional catalysts of the metal-hydrogen battery 100 include a mixture of different materials, such as transition metals and their oxides/hydroxides, which contribute to hydrogen evolution and oxidation reactions as a whole. In some embodiments, the catalyst layer 104b includes nanostructures of the bi-functional catalyst having sizes (or an average size) in a range of, for example, about 1 nm to about 100 nm, about 1 nm to about 80 nm, or about 1 nm to about 50 nm. In some embodiments, the catalyst layer 104b includes microstructures of the bi-functional catalyst having sizes (or an average size) in a range of, for example, about 100 nm to about 500 nm, about 500 nm to about 1000 nm.

In some embodiments, to create different affinities with respect to the electrolyte (e.g., electrolyte 108) on the anode 104, the catalyst layer 104b may be partially coated with a surface-affinity modification material. For example, when the catalyst layer 104b on the porous substrate 104a are hydrophilic to the electrolyte, the catalyst layer 104b may be partially or entirely coated with a material that is hydrophobic to the electrolyte. On the contrary, when the catalyst layer 104b on the porous substrate 104a are hydrophobic to the electrolyte, the catalyst layer 104b may be partially or entirely coated with a material that is hydrophilic to the electrolyte. This structure can facilitate movement of hydrogen gas in the pores of the anode 104 and improve HOR during discharge.

The cathode 102 may include a conductive substrate 102a and a coating 102b covering the conductive substrate 102a. The coating 102b includes a redox-active material that includes a transition metal. In some embodiments, the conductive substrate 102a is porous, such as having a porosity of at least about 10%, at least about 20%, at least about 30%, at least about 40%, or at least about 50%, and up to about 80%, up to about 90%, or greater. In some embodiments, the conductive substrate 102a is a metal foam, such as a nickel foam, or a metal alloy foam. Other conductive substrates are encompassed by this disclosure, such as metal foils, metal meshes, and fibrous conductive substrates. In some embodiments, the transition metal included in the redox-active material is nickel. In some embodiments, nickel is included as nickel hydroxide or nickel oxyhydroxide. In some embodiments, the transition metal included in the redox-reactive material is cobalt. In some embodiments, cobalt is included as cobalt oxide or zinc cobalt oxide. In some embodiments, the transition metal included in the redox-active material is manganese. In some embodiments, manganese is included as manganese oxide or doped manganese oxide (e.g., doped with nickel, copper, bismuth, yttrium, cobalt or other transition or post-transition metals). Other transition metals are encompassed by this disclosure, such as silver. In some embodiments, the cathode 102 is a cathode, and the anode 104 is an anode. In some embodiments, the coating microstructures of the redox-active material, may have sizes (or an average size) in a range of, for example, about 1 μm to about 100 μm, about 1 μm to about 50 μm, or about 1 μm to about 10 μm.

In some embodiments, the electrolyte 108 is an aqueous electrolyte. The aqueous electrolyte is alkaline and has a pH greater than 7, such as about 7.5 or greater, about 8 or greater, about 8.5 or greater, or about 9 or greater, or about 11 or greater, or about 13 or greater. As a non-limiting example, the electrolyte 108 may include KOH or NaOH or LiOH or a mixture of LiOH, NaOH and/or KOH.

Although hydrogen oxidation catalysts such as inexpensive transition metals are suitable for metal-hydrogen batteries, they may be passivated during prolonged HOR and significantly hindered their use in practical devices. According to some embodiments of the present disclosure, catalyst 104*b* can be a bi-functional TMA (transition metal alloy). In some embodiments, combinations of Ni, Co, Cr, Mo, Fe and W can be used as an alternative to the bi-functional TMA catalyst. For example, a catalyst composed of Ni with CrOx particles decorating the surface can be used. A small amount of Pt can be added to further improve the activity. One such TMA catalyst is described in U.S. patent application Ser. No. 16/373,247, which is herein incorporated by reference in its entirety.

Batteries formed with the TMA catalyst described here show a slow decay in the energy efficiency, primarily caused by voltage losses during discharge. Tests with a 3-electrode configuration shows a potential on anode 104 that generally increases beyond 0.1V when the overall battery voltage drops below 0.95V during degradation. It has also been discovered that the TMA catalyst shows remarkable improvements towards the discharge reaction (HOR) without damaging the catalyst. This catalyst further demonstrates high T performance gains and can operate efficiently at high temperature. Regeneration efforts can be enhanced at higher operating temperatures, and in particular at temperatures higher than room temperature.

Significant surface passivation begins to occur when the anode overpotential reaches about 0.1 or 0.1 V vs. $H_2/H_2O$. At some point, the passivation begins to outpace HOR and the potential rapidly ramps as more oxide grows on the catalysts such that the catalyst activity degrades. Techniques disclosed herein may reverse the passivation and restore degraded batteries back to their energy efficient state.

Figure 1C:
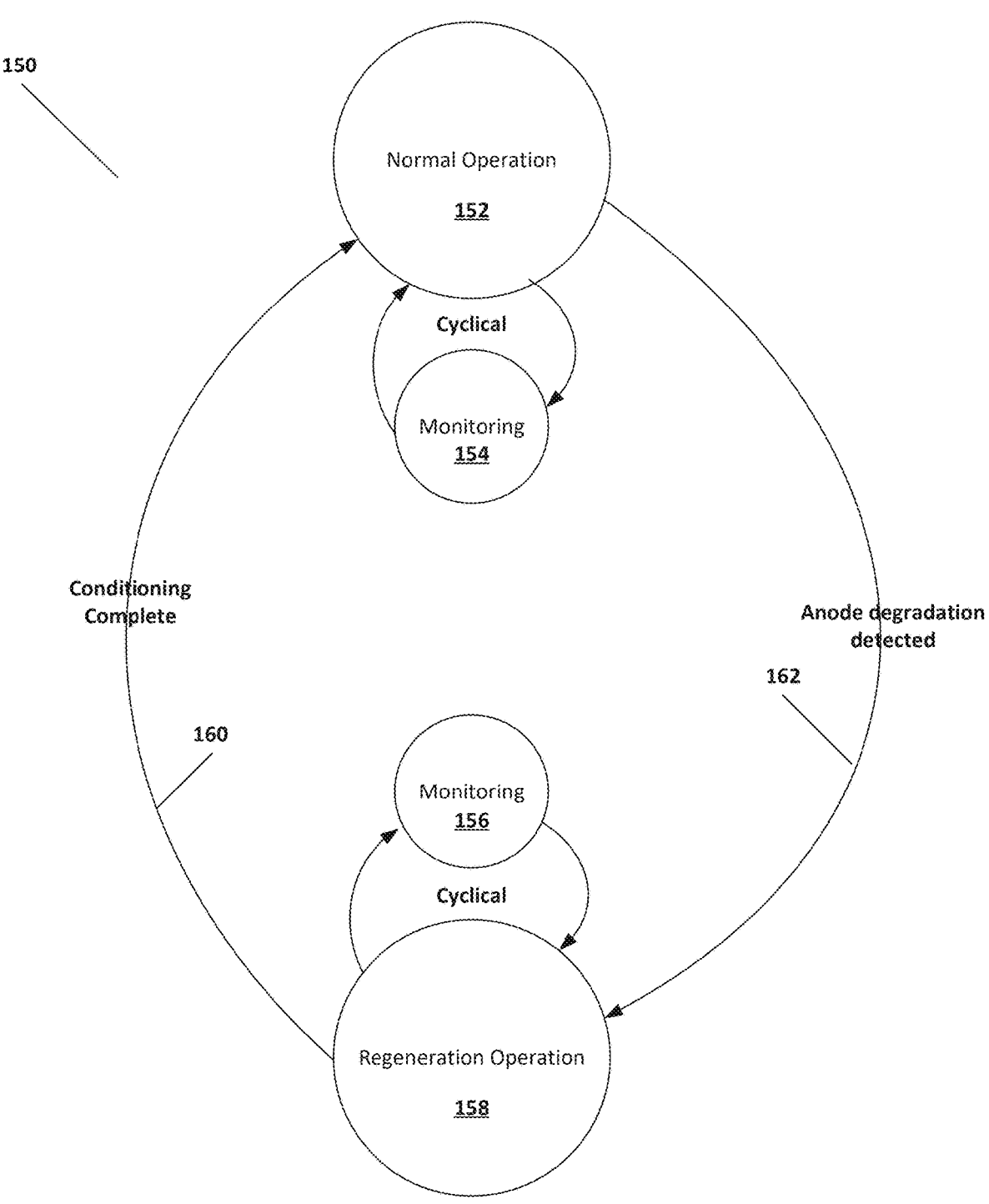
FIG. 1C illustrates a state function for operation of a metal-hydrogen battery as illustrated in FIG. 1B.

FIG. 1C illustrates a state function 150 of an example operation of processor 134 illustrated in FIG. 1B. As is illustrated in FIG. 1C, state function 150 includes a normal operation state 152 in which charge and discharge cycles are performed by battery 100. During normal operation 152, a monitoring state 154 is also operating. Monitoring state 154 monitors voltages and/or currents in battery 100 to determine when degradation has occurred. Monitoring state 154 is continuously or cyclically engaged during normal operation state 152.

If a degradation is detected through monitoring state 154, then state function 150 transitions from normal operation 152 to a regeneration state 158. In regeneration state 158, battery 100 is cycled in such a way as to recover, at least partially, the degradation that was detected. As is further illustrated, a monitoring step 156 monitors the charge and current of battery 100 during cycling in state 158 to determine when battery 100 has recovered. Once recovered, then state 150 returns to normal monitoring state 152. These states are discussed in further detail below. As is further described, higher temperature operation may be used in regeneration state 158 to enhance recovery of the battery 100.

Figure 2:
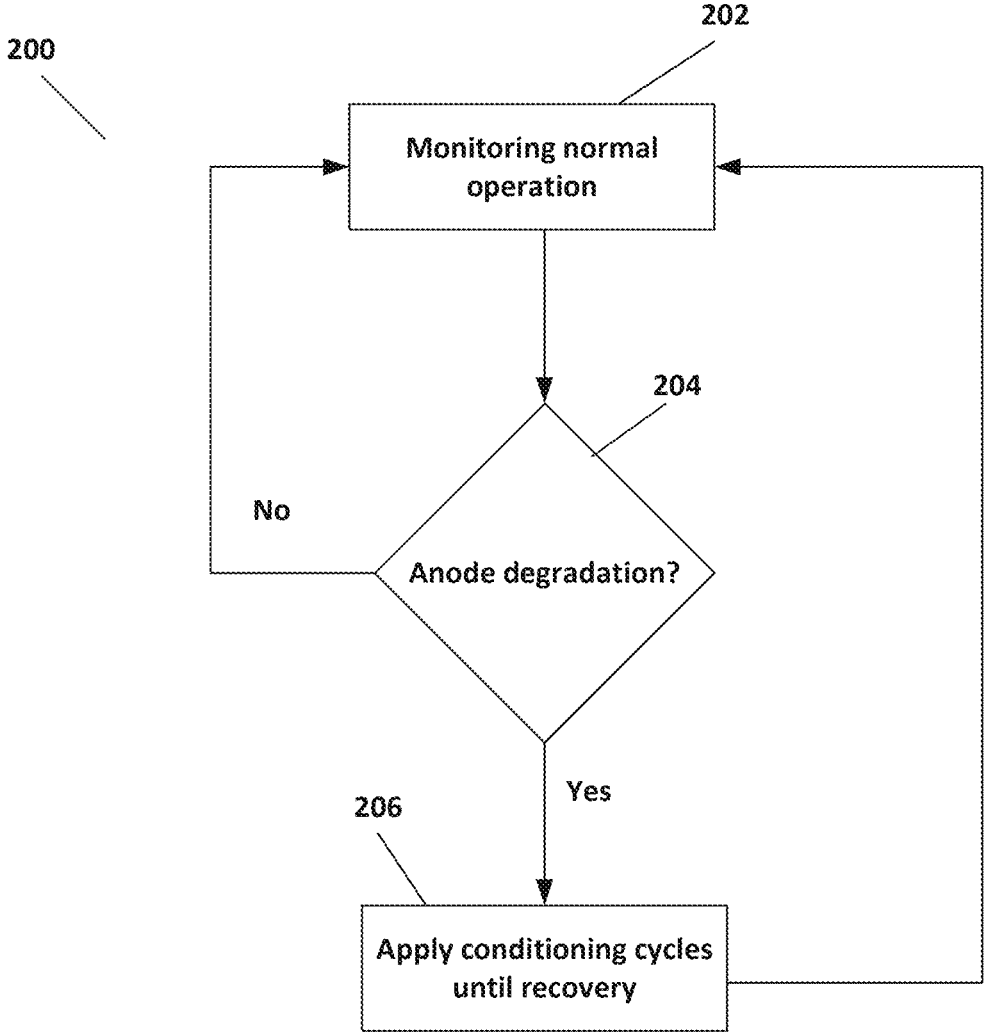
FIG. 2 is a flow chart illustrating a method for operating a metal-hydrogen battery according to the state function illustrated in FIG. 1C, according to some embodiments.
Figure 3:
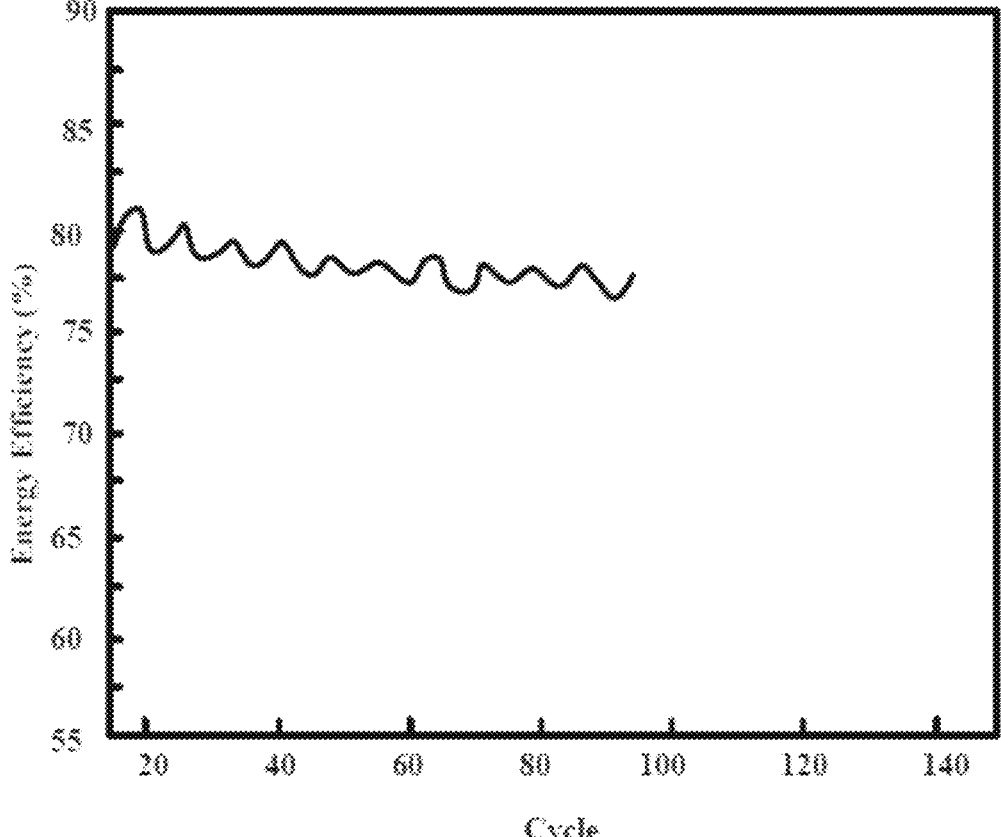
FIG. 3 is a diagram depicting energy efficiency versus cycle of a metal-hydrogen battery, according to some embodiments.

FIG. 2 is a flow chart illustrating a method 200 for operating a metal-hydrogen battery consistent with state function 150 illustrated in FIG. 1C, according to one example embodiment. In some embodiments, the method 200 can regenerate a degraded metal-hydrogen battery by reversing oxide passivation on the electrodes of the metal-hydrogen battery. At 202, an indicator of degradation of the anode of the metal-hydrogen battery during cycles of discharge and charge is monitored during monitoring state 154. For example, when the metal-hydrogen battery is subject to repeated cycles of discharge and charge operations during normal operation 152, an indicator of degradation of those operations may be obtained or calculated according to techniques disclosed herein. In some embodiments, the indicator of degradation may also indicate energy efficiency. An example of the energy efficiency during cycles of discharge and charge in a battery such as battery 100 is illustrated in FIG. 3. FIG. 3 is a diagram depicting energy efficiency versus cycle of a metal-hydrogen battery, according to one example embodiment. As shown in FIG. 3, the energy efficiency of the metal-hydrogen battery decreases as more cycles of discharge and charge are performed, indicating that the performance of the metal-hydrogen battery is degrading/decayed. The energy efficiency can be determined, for example, by monitoring the current, duration, and cell voltage during charge in comparison with the current, duration, and cell voltage during discharge of the battery in each cycle. In some embodiments, the energy efficiency can be monitored by monitoring the voltage on anode 104, which can also be used as an indicator of anode degradation. Other methods may also be used to monitor an indicator and determine whether or not degradation has occurred sufficiently to trigger entry to regeneration state 158.

Referring back to FIG. 2, at 204, it is determined whether the monitored indicator of the metal-hydrogen battery during the monitored cycles of discharge and charge indicates decay beyond a threshold value. Whether the monitored indicator of degradation of the metal-hydrogen battery during the cycles of discharge and charge indicates a decay can be determined in a number of ways as is described further below.

If it is determined from the monitored indicator of the metal-hydrogen battery during the monitored cycles of discharge and charge is not decayed (i.e. the monitored indicator has not reached the threshold value), the method returns to operation 202 to continue monitoring the indicator of the metal-hydrogen battery. But if it is determined that the monitored indicator of the metal-hydrogen battery during the monitored cycles of discharge and charge indicates analog decay below a threshold value, reconditioning cycles of discharge and charge are applied to the metal-hydrogen battery in 206. In 206, the reconditioning cycles of discharge and charge utilize a different discharge or charge condition, different from the normal cycles of discharge and charge performed in normal operation state 152, to regenerate the metal-hydrogen battery such that discharge and charge performance of the metal-hydrogen battery at the end of the reconditioning cycles of discharge and charge is better than that of metal-hydrogen battery at the end of the monitored cycles of discharge and charge or at the beginning of the reconditioning cycles of discharge and charge. In some embodiments, the monitored cycles of discharge and charge may be in the normal operation of the metal-hydrogen battery or a specific session of testing the performance of the metal-hydrogen battery, while the reconditioning cycles of discharge and charge may be referred to as remedial/self-healing cycles (or regeneration cycles) of discharge and charge that are configured to regenerate the degraded metal-hydrogen battery.

Figure 4:
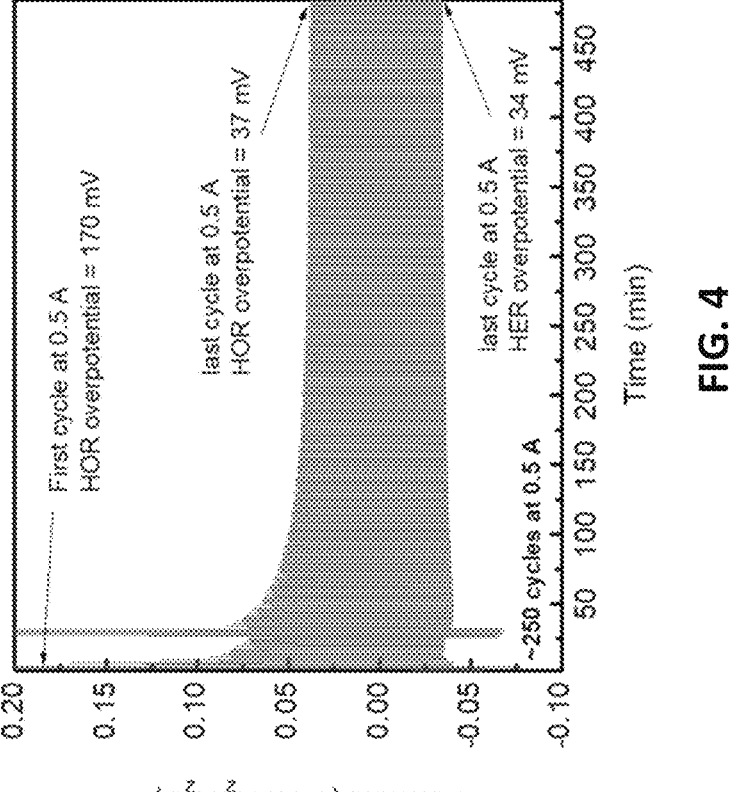
FIG. 4 is a diagram showing chronopotentiometric measurement results on an anode in a 3-electrode metal-hydrogen battery cell, according to some embodiments.

For example, a degraded metal-hydrogen battery may be regenerated by subsequent symmetric cycling where a same current for a same duration is applied to the metal-hydrogen battery during each of the subsequent cycles (e.g., following the monitored cycles) of discharge and charge. A non-limiting example is shown in FIG. 4. FIG. 4 is a diagram showing chronopotentiometric measurement results on an anode 104 in a 3-electrode metal-hydrogen battery cell, according to one example embodiment. The metal-hydrogen battery cell employs a 26% KOH electrolyte 110. A constant current of 0.5 A is applied at each cycle of discharge and charge for 2 minutes. As shown in FIG. 4, at the beginning of the subsequent/reconditioning cycles, the potential at the anode is about 170 mV vs. $H_2/H_2O$, indicating the surface of the anode is covered by oxides that hinder the HOR. The potential at the anode is brought down quickly after initial 10 cycles to less than 100 mV vs. $H_2/H_2O$. And after 250 cycles, the HOR and HER potentials are stable at about 37 mV vs. $H_2/H_2O$ and 34 mV vs. $H_2/H_2O$, respectively, indicating a significant performance improvement of the metal-hydrogen battery. Based on these techniques, a degraded metal-hydrogen battery can be regenerated such that the performance of the metal-hydrogen battery at the end of the reconditioning (e.g., remedial/self-healing) cycles of discharge and charge is better than that at the beginning of the reconditioning cycles of discharge and charge.

Figure 5:
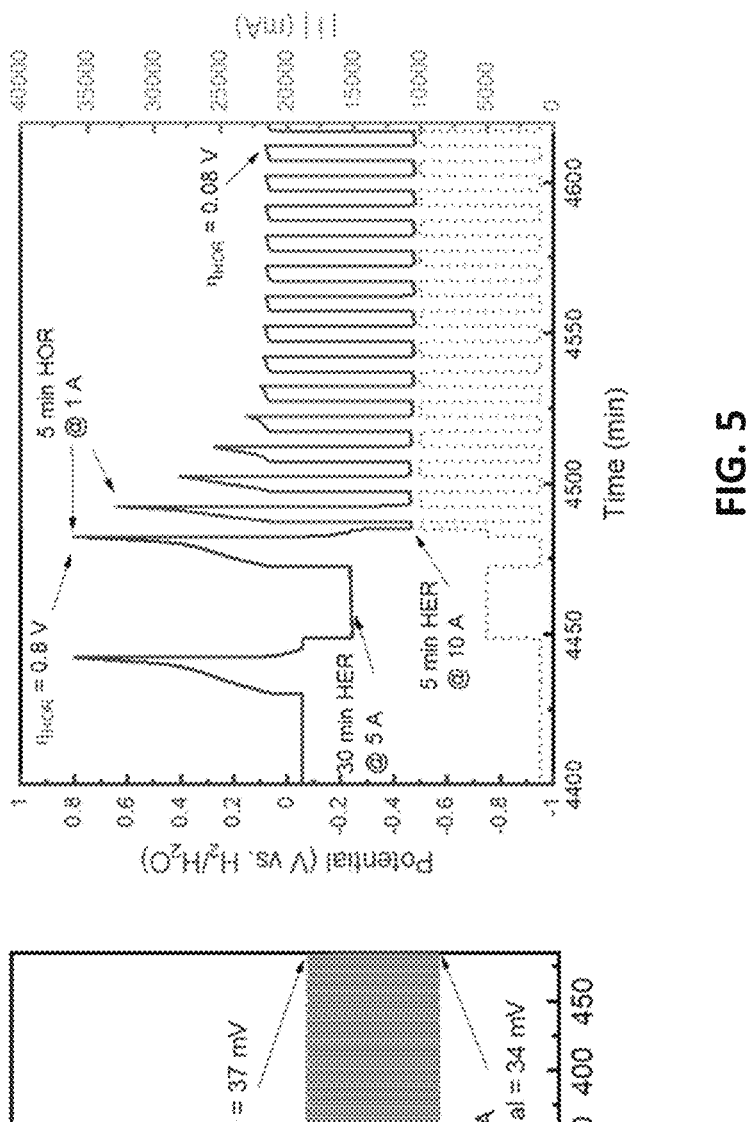
FIG. 5 is a diagram showing chronopotentiometric measurement results on an anode in a 3-electrode metal-hydrogen battery cell, according to some embodiments.

In some embodiments, a degraded metal-hydrogen battery may be regenerated by subsequent asymmetric cycling where different currents are applied to the metal-hydrogen battery in the discharge and charge operations. In some embodiments, the time periods of the discharge and charge operations in the subsequent asymmetric cycling may be different. A non-limiting example is shown in FIG. 5. FIG. 5 is a diagram showing chronopotentiometric measurement results on an anode in a 3-electrode metal-hydrogen battery cell, according to one example embodiment. The metal-hydrogen battery cell employs a 26% KOH electrolyte.

As shown in FIG. 5, at the beginning of the subsequent/reconditioning cycles, the HOR potential at the anode is about 800 mV vs. $H_2/H_2O$, indicating the surface of the anode is covered by oxides that hinder the HOR. In the subsequent/reconditioning cycles, a current of 5 A is applied at the initial charge operation (HER) for 30 minutes, followed by a discharge operation (HOR) in which a current of 1 A is applied for 5 minutes. After the initial charge and discharge operations, an iterated of charge and discharge operations are applied to the metal-hydrogen battery, where a current of 10 A is applied at a charge operation (HER) for 5 minutes, followed by a discharge operation (HOR) in which a current of 1 A is applied for 5 minutes. After about 6 reconditioning (e.g., remedial/self-healing) cycles of discharge and charge, the potential at the anode is brought down quickly to less than 100 mV vs. $H_2/H_2O$, indicating a significant performance improvement of the metal-hydrogen battery. Based on these techniques, a degraded metal-hydrogen battery can be regenerated such that the performance of the metal-hydrogen battery at the end of the reconditioning (e.g., remedial/self-healing) cycles of discharge and charge is better than that at the beginning of the reconditioning cycles of discharge and charge.

Figure 6A:
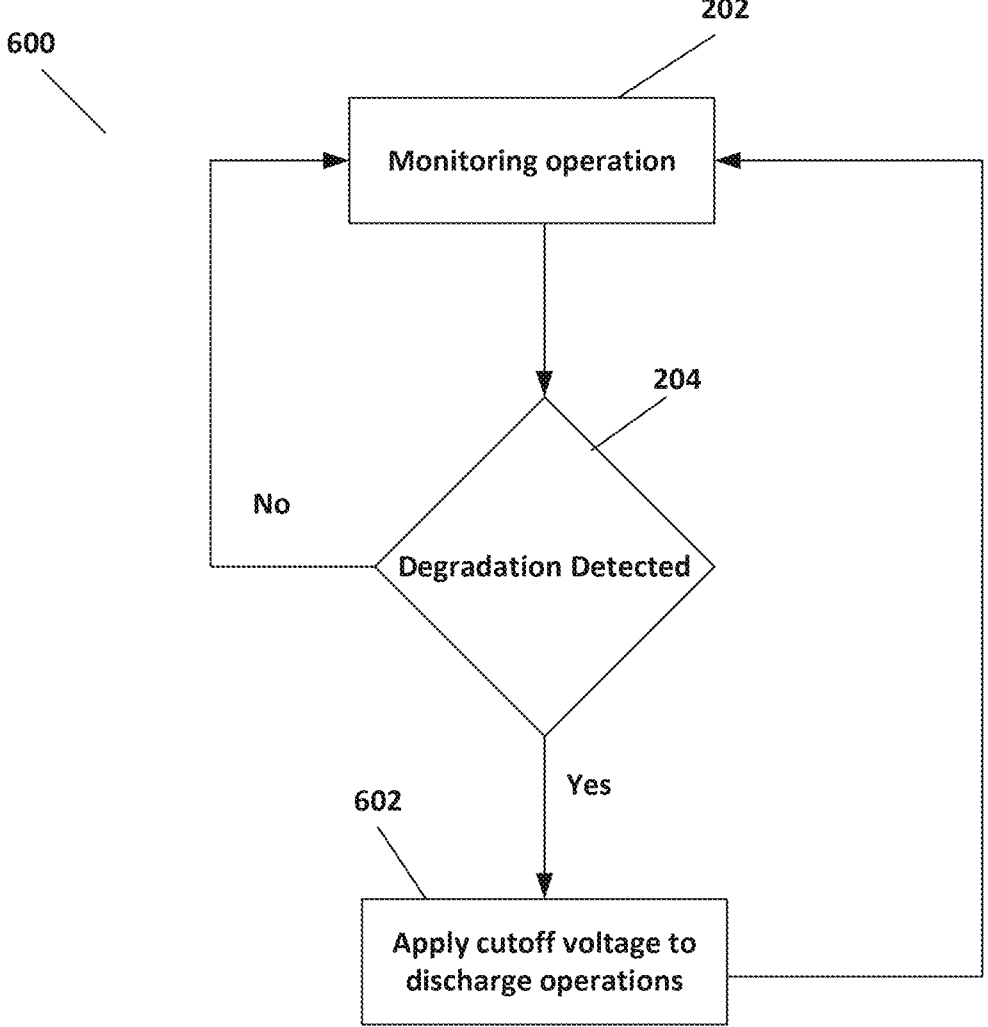
FIG. 6A is a flow chart illustrating a method for operating a metal-hydrogen battery, according to some embodiments.

FIG. 6A is a flow chart illustrating another method 600 for operating a metal-hydrogen battery, according to one example embodiment. In some embodiments, the method 600 can regenerate a degraded metal-hydrogen battery by reversing oxide passivation on the electrodes of the metal-hydrogen battery. As discussed above, at 202, the metal-hydrogen battery during cycles of discharge and charge is monitored. For example, when the metal-hydrogen battery is subject to repeated cycles of discharge and charge operations, an indicator of degradation during those operations may be obtained or calculated based on the monitoring. At 204, it is determined whether the monitored indicator of the metal-hydrogen battery during the monitored cycles of discharge and charge indicates a degenerated anode.

If it is determined in step 204 that conditions indicating degradation of the metal-hydrogen battery during the monitored cycles of discharge and charge have not been met, the method returns to operation 202 to continue monitoring the metal-hydrogen battery. But if it is determined that conditions indicate degradation of the metal-hydrogen battery during the monitored cycles of discharge and charge at step 204, method 600 increases a cutoff voltage to a predetermined voltage during discharge operations subsequent to the monitored cycles of discharge and charge in step 602 during state 158. This operation will regenerate the metal-hydrogen battery such that discharge and charge performance of the metal-hydrogen battery is improved. In some embodiments, the predetermined cutoff voltage may be about 0.6, 0.8, 1, 1.2, or 1.5 V. In some embodiments, the monitored cycles of discharge and charge may be in the normal operation of the metal-hydrogen battery or a specific session of testing the performance of the metal-hydrogen battery, while the discharge operations subsequent to the monitored cycles of discharge and charge may be parts of remedial/self-healing cycles of discharge and charge subsequent to the monitored cycles of discharge and charge.

Figure 6B:
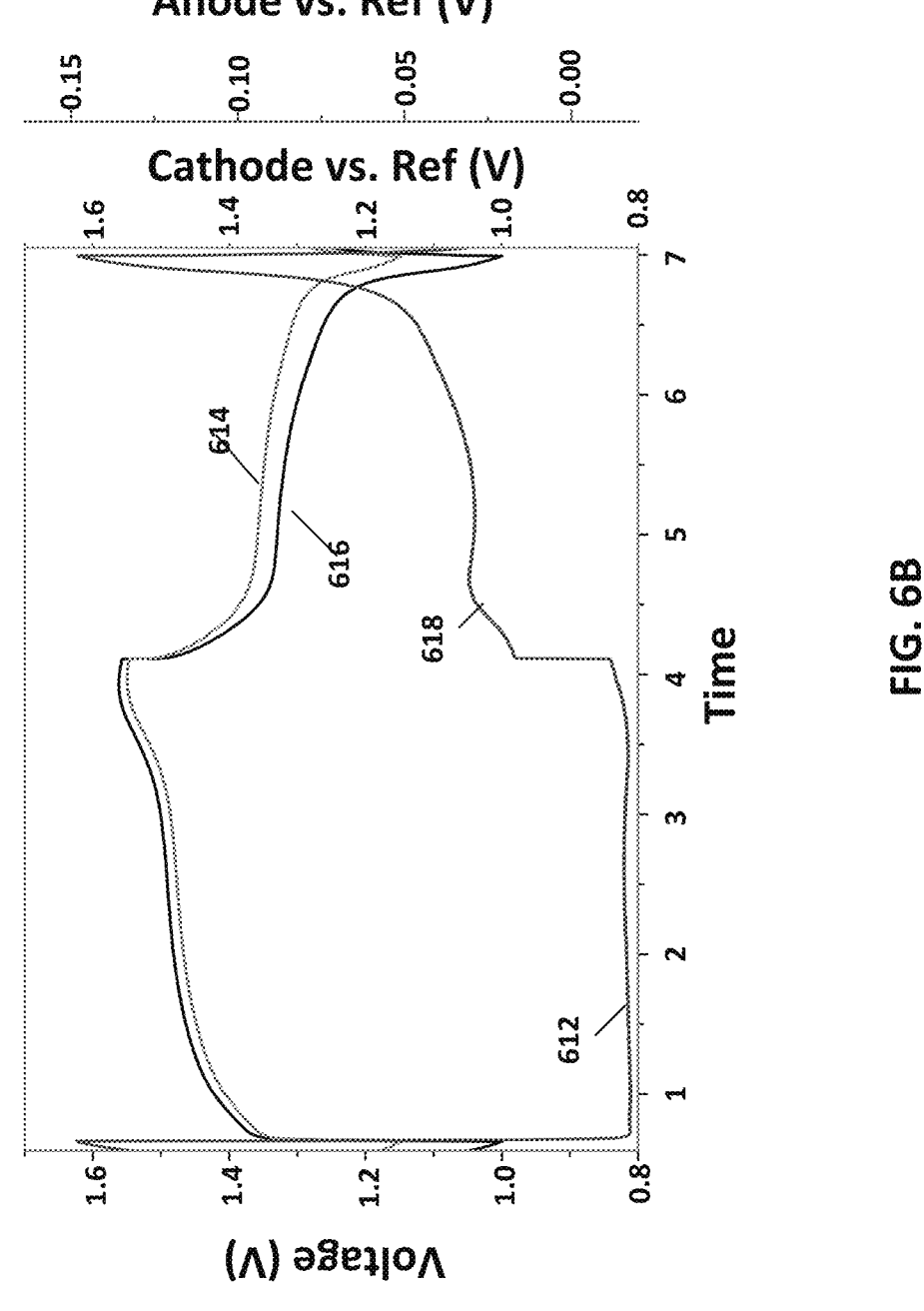
FIG. 6B illustrates operation of a metal-hydrogen battery according to some embodiments.

In some embodiments, a third platinum reference electrode can be included. Such a reference electrode allows for the independent monitoring of the anode and cathode voltages in a cell. FIG. 6B demonstrates an example 160 Ah battery during operation 610. In particular, the battery illustrated in operation 610 can be characterized by a C rate of C/5, charge capacity (CCAP) of 153 Ah, CE of 83%, EE of 73%, and VE of 88%. FIG. 6B illustrates an anode voltage vs the reference in curve 612, a cathode voltage vs the reference at curve 614, and the output voltage in curve 616. As is illustrated, the anode voltage 612 shows rapid voltage increase at area 618, near the end of discharge. As is illustrated at the same time, the battery performance, as indicated by the cathode voltage vs reference curve 614 and the battery output voltage 616, is hindered as a result. As illustrated, an anode voltage rising above 0.06V vs. $H_2/H_2O$ limits cell performance may trigger step 204 of algorithm 600 to proceed to step 602 as indicated below.

Figure 7A:
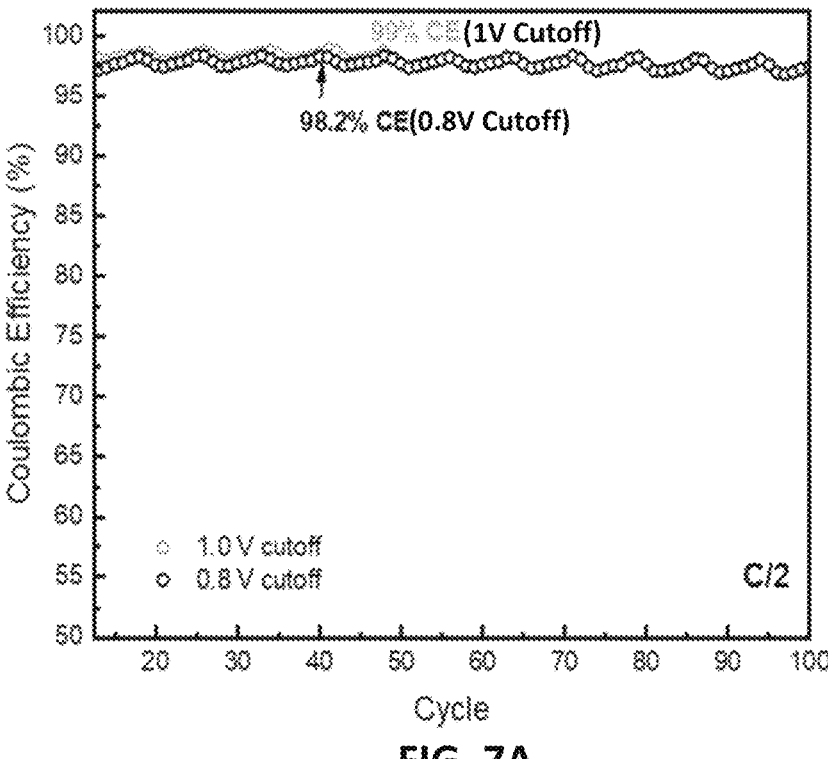
FIGS. 7A-7C are diagrams illustrating improved charge and discharge efficiencies by applying an increased cutoff discharge voltage, according to various embodiments.
Figure 7B:
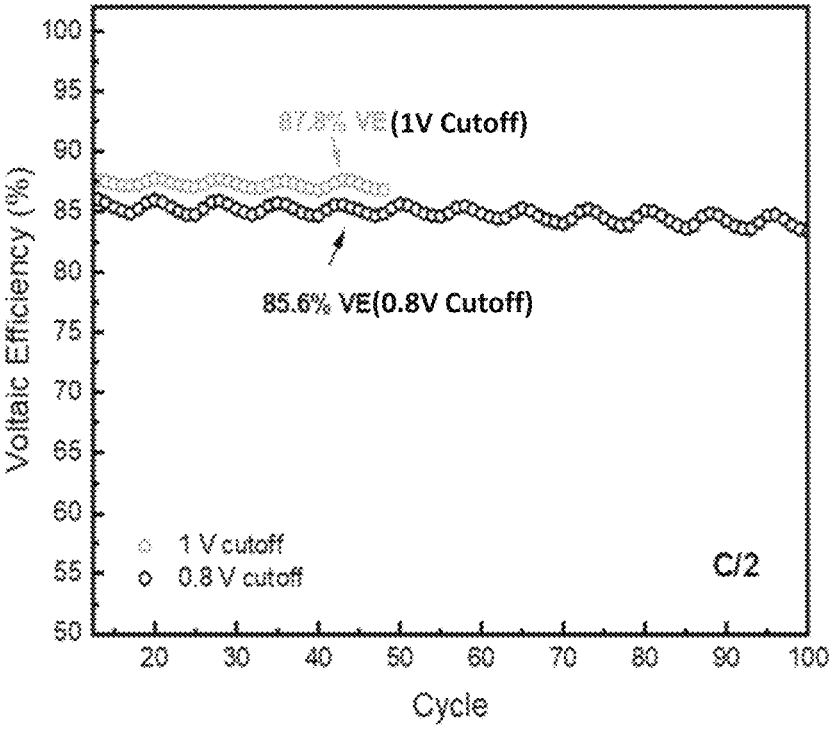
Figure 7C:
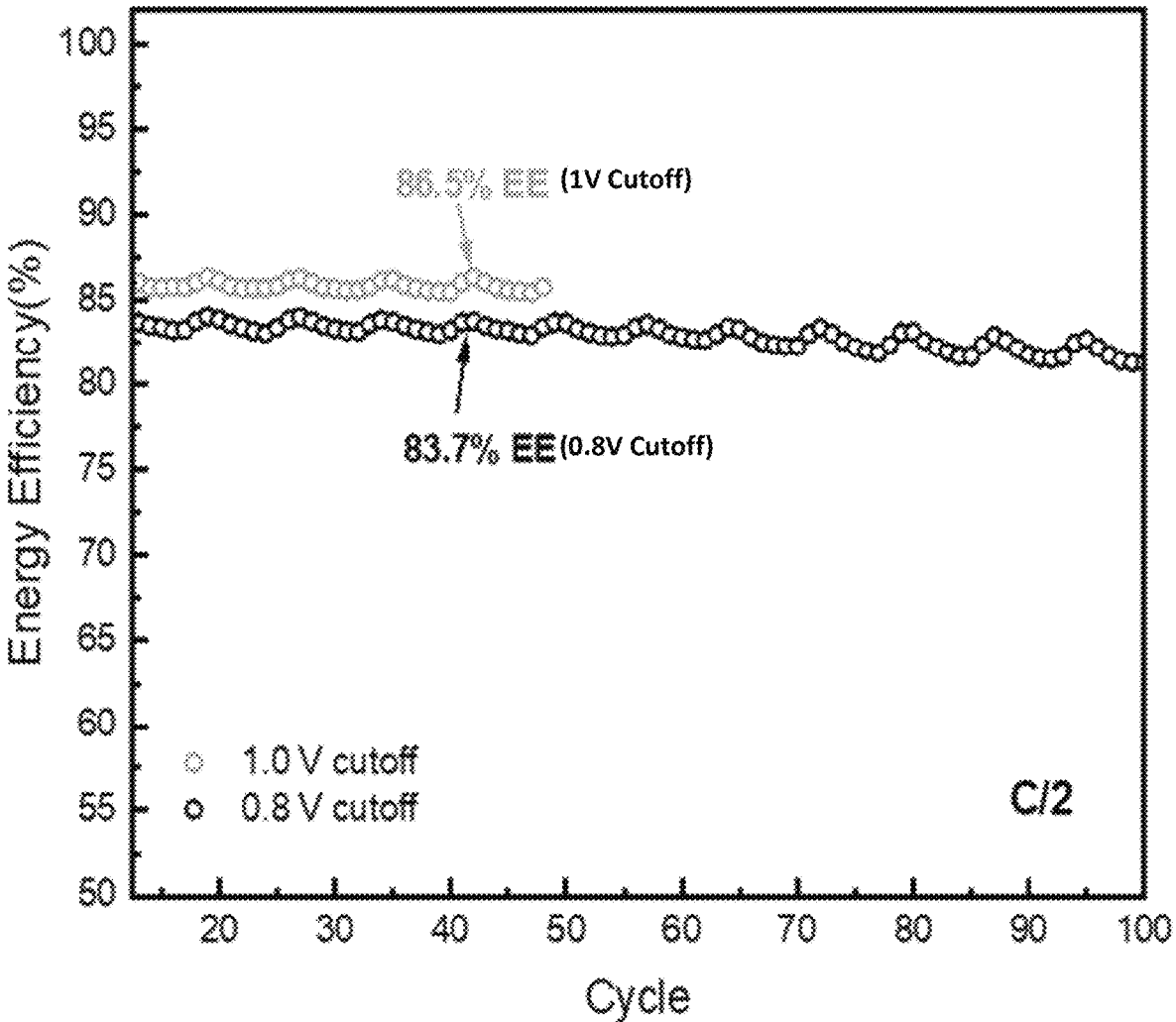

FIGS. 7A-7C are diagrams illustrating improved charge and discharge efficiencies by applying an increased cutoff discharge voltage, according to various embodiments. FIG. 7A depicts columbic efficiency (CE) for a 4 Ah battery cell cycling at C/2. FIG. 7B depicts voltaic efficiency (VE) for a 4 Ah battery cell cycling at C/2. FIG. 7C depicts energy efficiency (EE) for a 4 Ah battery cell cycling at C/2.

In FIGS. 7A-7C, the discharge cutoff voltage is 0.8V during the monitored cycles of discharge and charge in normal operation state 152, and is increased to 1V during the discharge operations subsequent to the monitored cycles of discharge and charge in 602 of method 600 during regeneration state 158. FIG. 7A depicts columbic efficiency (CE), defined as the ratio of the total charge extracted from the battery to the total charge put into the battery over a full charge/discharge cycle, for a 4 Ah battery cell cycling at C/2. As shown in FIG. 7A, after about 40 cycles of discharge and charge, the CE for 0.8V discharge cutoff voltage is about 98.2% while the CE 1V discharge cutoff voltage is about 99%. FIG. 7B depicts voltaic efficiency (VE), defined as the difference between the average voltage during charging and during discharging over a charge/discharge cycle, for a 4 Ah battery cell cycling at C/2. After about 45 cycles of discharge and charge, the VE for 0.8V discharge cutoff voltage is about 85.6% while the VE 1V discharge cutoff voltage is about 87.8%. FIG. 7C depicts energy efficiency (EE), defined as the ratio of the current provided to the battery to the current retrieved from the battery during a full cycle, for a 4 Ah battery cell cycling at C/2. After about 45 cycles of discharge and charge, the EE for cycles with 0.8V discharge cutoff voltage is about 83.7% while the EE for cycles with 1V discharge cutoff voltage is about 86.5%. These results demonstrate that increasing discharge cutoff voltage has an effect to regenerate the battery such that a degraded metal-hydrogen battery can have an increase energy efficiency.

Techniques disclosed herein can also be used to determine whether a metal-hydrogen battery is decayed in step 204 of FIGS. 2 and 6. As a nonlimiting example, a potential on an anode of the metal-hydrogen battery may be used as the monitored indicator to determine whether the metal-hydrogen battery is decayed. In some embodiments, the metal-hydrogen battery during the cycles of discharge and charge is determined to have been decayed when the potential on the anode of the metal-hydrogen battery is greater than about 0.1 V vs. $H_2/H_2O$. In some embodiments, the metal-hydrogen battery during the cycles of discharge and charge is determined to have been decayed when the potential on the anode of the metal-hydrogen battery is greater than about 75, 80, 85, 90, 95, 105, 110, 115, 120, or 125 mV vs. $H_2/H_2O$.

Figure 8:
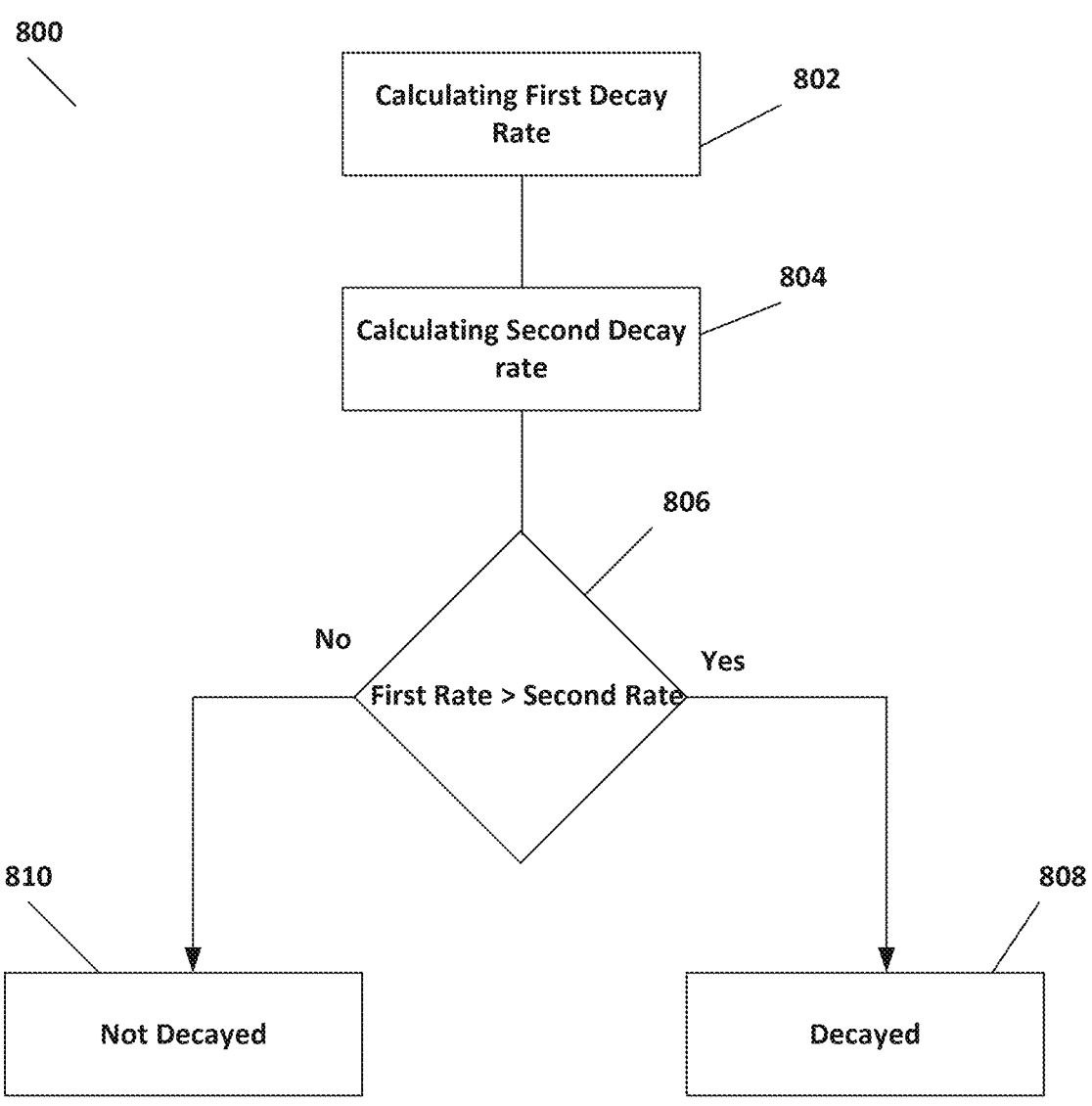
FIG. 8 is a flow chart illustrating a method for determining whether a metal-hydrogen battery anode is degenerated, according to some embodiments.

Another nonlimiting example method of determining whether the anode is degraded (likely from oxidation) in 204 is shown in FIG. 8. FIG. 8 is a flow chart illustrating a method 800 for determining whether a metal-hydrogen battery is degraded, according to one example embodiment. At 802, a first decaying rate of a discharge voltage during discharge operations of cycles of discharge and charge is calculated. At 804, a second decaying rate of a charge voltage during charge operations of the cycles of discharge and charge is calculated. At 806 it is determined whether the first decaying rate is greater than the second decaying rate by a threshold. If the first decaying rate is greater than the second decaying rate, at 808 it is determined that the energy efficiency of the metal-hydrogen battery during the cycles of discharge and charge is degraded. If the first decaying rate is not greater than the second decaying rate, at 810 it is determined that the energy efficiency of the metal-hydrogen battery during the cycles of discharge and charge is not degraded sufficiently. In the illustrated embodiment, the decaying rates of discharge and charge voltages are employed as an indicator for determining whether a metal-hydrogen battery is decayed. It is discovered that generally, the charge voltage decays slower with respect to the decay of the discharge voltage, but the decay rate of discharge increases substantially when sufficient degradation has occurred. This is because over a prolong use, oxides may be accumulated on the anode during HOR, passivating the catalyst sites for further HOR.

In some embodiments, a ratio of the first decaying rate and the second decaying rate may be determined and compared to a threshold to determine whether a metal-hydrogen battery is decayed. For example, the threshold may be set to a larger value, such as 2.0, 2.25, or 2.5 to catch significant decay of the metal-hydrogen battery. This can reduce the frequency to regenerate the metal-hydrogen battery. In some embodiments, the threshold may be set to a smaller value, such as between 1.5 and 2.0, inclusive, to identify an early stage decay of the metal-hydrogen battery.

Figure 9:
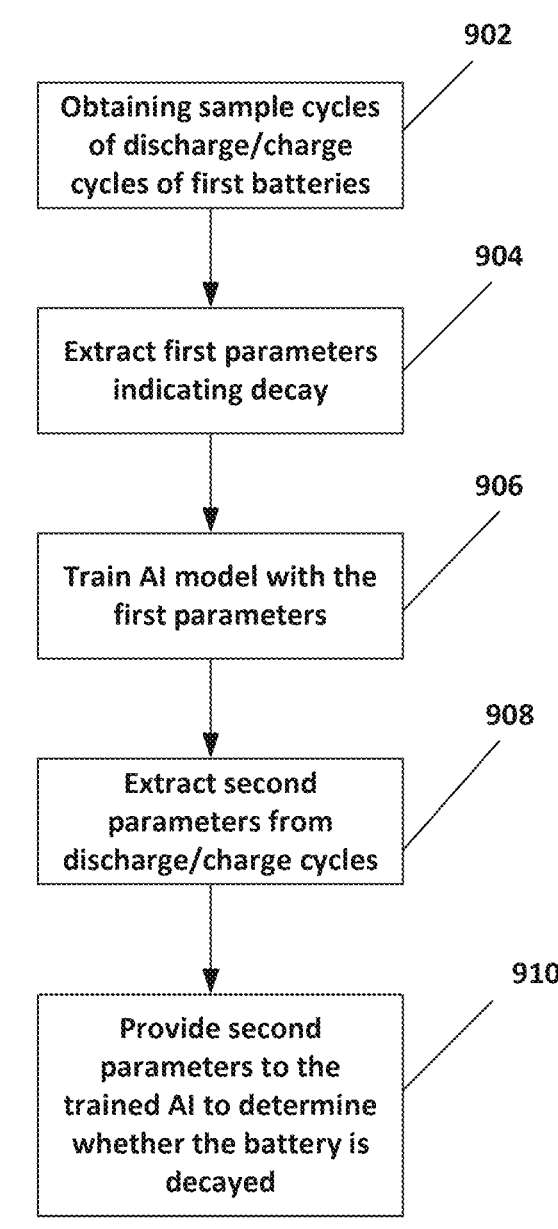
FIG. 9 is a flow chart illustrating another method for determining whether a metal-hydrogen battery anode is degenerated, according to some embodiments.

FIG. 9 is a flow chart illustrating another method 900 for determining whether a metal-hydrogen battery is decayed in 204, according to one example embodiment. The method 900 employs a machine learning model to automatically determine whether a metal-hydrogen battery is decayed. For example, in a battery system, each battery is associated with a communication interface configured to forward battery information to a server that manages the batteries in the battery system. The server may include a machine learning model to analyze the battery information of each battery and to identify if a particular batter is in need of regeneration in regeneration state 158 to recover the performance of the battery. If so, the server may employ the techniques disclosed herein such as those explained in connection with FIGS. 2 and 6 to regenerate the degraded battery.

With reference to FIG. 9, at 902, sample cycles of discharge and charge of a plurality of metal-hydrogen batteries are obtained. For example, a communication interface of each of the metal-hydrogen batteries may be configured to periodically or on demand forward battery information to the server. The battery information may include battery identifiers and the historical usage information of the battery such as how many cycles of discharge and charge the battery has undertaken, potentials at the anode and cathode during those cycles of discharge and charge, the state-of-charge, temperature, the battery voltage, coulombic efficiency vs. cycle, voltaic efficiency vs. cycle, energy efficiency vs. cycle, impedance data, pressure data, the derivative of charge vs voltage (dQ/dV), and other data parameters. The battery information is exemplary and non-limiting. Other battery performance indexes are contemplated. The battery information may be sent to the server along with a determination as to whether each of the plurality of metal-hydrogen batteries is determined to be decayed.

At 904, parameters of the sample cycles of discharge and charge indicating that the plurality of metal-hydrogen batteries are decayed are extracted. After the battery information is obtained, the server may be configured to analyze the battery information and extract parameters of the sample cycles of discharge and charge indicating that the plurality of metal-hydrogen batteries are decayed. In some embodiments, parameters of the sample cycles of discharge and charge indicating that the plurality of metal-hydrogen batteries are not decayed can also be extracted for training a machine-learning model.

At 906, a machine-learning model is trained with the extracted parameters to generate a trained machine-learning model. In some embodiments, the machine-learning model may undergo a supervised learning in which the extracted parameters are input to the machine-learning model with labels indicating whether a metal-hydrogen battery is decayed. Various models may be employed for the machine learning process. For example, neural networks, decision trees, regression analyses, support-vector machines, etc. may be adopted in operation 906 to generate a trained machine-learning model.

At 908, parameters of the cycles of discharge and charge of a metal-hydrogen battery in question during normal operation are extracted. When a new battery or any existing batter in the battery system is due for a determination of whether the battery is decayed, its battery information in obtained. Similar to operation 904, the parameters of the battery in question are extracted.

At 910, the extracted parameters of the battery in question are fed to the trained machine-learning model to determining whether the metal-hydrogen battery in question during cycles of discharge and charge is decayed. If the metal-hydrogen battery in question during cycles of discharge and charge is decayed, the server may initiate the techniques disclosed herein to regenerate the battery in question.

Based on these techniques, a battery management software system (BMS) may be established that allows metal-hydrogen batteries to last longer than NASA's battery cells at a cost of less than $150/kWh. The techniques allow the batteries to achieve decades of stability without using significant precious metal catalysts by controlling the surface oxidation state of the catalysts during cycling.

Extensive battery cycling data of metal-hydrogen batteries are collected under various conditions. The data is then used to train a cycling algorithm that becomes the basis of the battery management system. Field data of individual batteries in the battery system can be continuously sent back to the server and can be used to further improve the BMS algorithm. The individual batteries in the battery system can be periodically or on demand provided with updated BMS software, which can be automatically installed at the a controller for a battery to ensure each of the batteries last for decades with minimum physical maintenance.

The health of an anode of a metal-hydrogen battery depends on a plurality of factors including the state-of-charge, temperature, the battery voltage, etc.

In some embodiments, the cycles of discharge and charge as disclosed herein may be conducted at a temperature above the room temperature, such as at about 30° C., 40° C., 50° C., 60° C., 70° C., or 80° C., or between any two of the above values. Increasing operation temperature of a metal-hydrogen battery not only reduces the discharge potential at the anode of the metal-hydrogen battery, but also improves the reliability of the metal-hydrogen battery in the long term.

Consequently, by way of non-limiting examples, the following aspects are included in this disclosure.

Aspect 1 includes a method for operating a metal-hydrogen battery, the method comprising: monitoring an indicator of degradation of the metal-hydrogen battery during normal cycles of discharge and charge; determining whether the metal-hydrogen battery during normal cycles of discharge and charge is decayed based on the indicator; and in response to determining that the energy efficiency of the metal-hydrogen battery during the discharge and charge is decayed due to anode oxidation, regenerating the metal-hydrogen battery.

Aspect 2 includes the method of aspect 1, wherein the metal-hydrogen battery decays due to anode oxidation during normal cycles of discharge and charge.

Aspect 3 includes the method of aspect 1, wherein regenerating the metal-hydrogen battery includes applying reconditioning cycles of discharge and charge to the metal-hydrogen battery, wherein the reconditioning cycles of discharge and charge utilize a discharge or charge condition different from normal cycles of discharge and charge.

Aspect 4 includes the method of aspect 3, wherein applying the reconditioning cycles of discharge and charge to the metal-hydrogen battery comprises: applying a same current for a same duration during each of the reconditioning cycles of discharge and charge.

Aspect 5 includes the method of aspect 3, wherein applying the reconditioning cycles of discharge and charge to the metal-hydrogen battery comprises: applying a first current during charge operations of the reconditioning cycles of discharge and charge; and applying a second current during discharge operations of the reconditioning cycles of discharge and charge, wherein the first current is greater than the second current.

Aspect 6 includes the method of aspect 1, wherein determining whether the performance of the metal-hydrogen battery during normal cycles of discharge and charge is decayed based on the indicator comprises: calculating a first decaying rate of a discharge voltage during discharge operations of the normal cycles of discharge and charge; calculating a second decaying rate of a charge voltage during charge operations of the first normal cycles of discharge and charge; and determining that the metal-hydrogen battery during the first normal cycles of discharge and charge is decayed when the first decaying rate is greater than the second decaying rate.

Aspect 7 includes the method of aspect 1, wherein the metal-hydrogen battery during normal cycles of discharge and charge is determined to be decayed when a potential on an anode of the metal-hydrogen battery is greater than a threshold voltage.

Aspect 8 includes the method of aspect 7, wherein the threshold voltage is about 0.1 V vs. $H_2/H_2O$.

Aspect 9 includes the method of aspect 1, wherein determining whether the metal-hydrogen battery during normal cycles of discharge and charge is decayed based on the indicator comprises: obtaining sample cycles of discharge and charge of a plurality of first metal-hydrogen batteries; extracting first parameters of the sample cycles of discharge and charge indicating that the plurality of first metal-hydrogen batteries are decayed; training a machine-learning model with the first parameters to generate a trained machine-learning model; extracting second parameters of the cycles of discharge and charge of the metal-hydrogen battery; and feeding the second parameters to the trained machine-learning model to determining whether the metal-hydrogen battery during normal cycles of discharge and charge is decayed.

Aspect 10 includes the method of aspect 1, further comprising: conducting normal cycles of discharge and charge at a temperature above a room temperature.

Aspect 11 includes the method of aspect 1, further comprising: conducting the reconditioning cycles of discharge and charge at a temperature above a room temperature.

Aspect 12 includes the method of aspect 1, wherein regenerating the metal-hydrogen battery includes increasing a cutoff voltage to a predetermined voltage during discharge operations subsequent to the cycles of discharge and charge.

Aspect 13 includes a metal-hydrogen battery, comprising: a vessel; at least one cell comprising a cathode and an anode, the anode and the cathode each having a catalyst, the at least one cell contained within the vessel, the at least one cell supporting a hydrogen evolution reaction (HER) and a hydrogen oxidation reaction (HOR) during charge and discharge cycles; an electrolyte contained in the vessel; and a controller coupled to the at least one cell, the controller executing instructions to monitor an indicator of degradation of the metal-hydrogen battery during first normal cycles of discharge and charge; determine whether the metal-hydrogen battery during the first normal cycles of discharge and charge is decayed based on the indicator; and in response to determining that the metal-hydrogen battery during normal cycles of discharge and charge is decayed, regenerate the metal-hydrogen battery.

Aspect 14 includes the metal-hydrogen battery of claim 13, wherein the metal-hydrogen battery decays during normal cycles of discharge and charge due to anode oxidation.

Aspect 15 includes the battery of aspect 13, wherein instructions to regenerate the metal-hydrogen battery includes instructions to apply reconditioning cycles of discharge and charge to the metal-hydrogen battery, wherein the reconditioning cycles of discharge and charge utilize a discharge or charge condition different from normal cycles of discharge and charge.

Aspect 16 includes the battery of aspect 15, wherein instructions to apply the reconditioning cycles of discharge and charge to the metal-hydrogen battery comprises: applying a same current for a same duration during each of the reconditioning cycles of discharge and charge.

Aspect 17 includes the battery of aspect 15, wherein instructions to apply the reconditioning cycles of discharge and charge to the metal-hydrogen battery includes instructions to apply a first current during charge operations of the reconditioning cycles of discharge and charge; and apply a second current during discharge operations of the reconditioning cycles of discharge and charge, wherein the first current is greater than the second current.

Aspect 18 includes the battery of aspect 13, wherein instructions to determine the metal-hydrogen battery during normal cycles of discharge and charge is decayed based on the indicator comprises instructions to: calculate a first decaying rate of a discharge voltage during discharge operations of normal cycles of discharge and charge; calculate a second decaying rate of a charge voltage during charge operations of normal cycles of discharge and charge; and determine that the energy efficiency of the metal-hydrogen battery during normal cycles of discharge and charge is decayed when the first decaying rate is greater than the second decaying rate.

Aspect 19 includes the battery of aspect 13, wherein the performance of the metal-hydrogen battery during normal cycles of discharge and charge is decayed when a potential on an anode of the metal-hydrogen battery is greater than a threshold voltage.

Aspect 20 includes the battery of aspect 19, wherein the threshold voltage is about 0.1 V vs. $H_2/H_2O$.

Aspect 21 includes the battery of aspect 13, wherein instructions to determine whether the metal-hydrogen battery during normal cycles of discharge and charge is decayed based on the indicator includes instructions to obtain sample cycles of discharge and charge of a plurality of metal-hydrogen batteries; extract first parameters of the sample cycles of discharge and charge indicating that the plurality of metal-hydrogen batteries are decayed due to anode oxidation; train a machine-learning model with the first parameters to generate a trained machine-learning model; extract second parameters of the cycles of discharge and charge of the metal-hydrogen battery; and feed the second parameters to the trained machine-learning model to determining whether the metal-hydrogen battery during normal cycles of discharge and charge is decayed due to anode oxidation.

Aspect 22 includes the battery of aspect 13, further comprising: instructions to conduct normal cycles of discharge and charge at a temperature above a room temperature.

Aspect 23 includes the battery of aspect 13, further comprising: instructions to conduct the reconditioning cycles of discharge and charge at a temperature above a room temperature.

Aspect 24 includes the battery of aspect 13, wherein instructions to regenerate the metal-hydrogen battery includes instructions to increase a cutoff voltage to a predetermined voltage during discharge operations subsequent to the cycles of discharge and charge.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the disclosure be defined by the following claims and their equivalence.

What is claimed is:

1. A method for operating a metal-hydrogen battery, the method comprising:

monitoring an indicator of degradation of the metal-hydrogen battery during normal cycles of discharge and charge;

determining whether the metal-hydrogen battery during normal cycles of discharge and charge is decayed based on the indicator; and in response to determining that the energy efficiency of the metal-hydrogen battery during normal cycles of discharge and charge is decayed due to anode oxidation, regenerating the metal-hydrogen battery, wherein the indicator is a potential on an anode of the metal-hydrogen battery, and wherein the metal-hydrogen battery during the normal cycles of discharge and charge is determined to be decayed when the potential on the anode of the metal-hydrogen battery is greater than a threshold voltage.

2. The method of claim 1, wherein the metal-hydrogen battery decays due to anode oxidation during the normal cycles of discharge and charge.

3. The method of claim 1, wherein regenerating the metal-hydrogen battery includes applying reconditioning cycles of discharge and charge to the metal-hydrogen battery, wherein the reconditioning cycles of discharge and charge utilize a discharge or charge condition different from the normal cycles of discharge and charge.

4. The method of claim 3, wherein applying the reconditioning cycles of discharge and charge to the metal-hydrogen battery comprises:

applying a same current for a same duration during each of the reconditioning cycles of discharge and charge.

5. The method of claim 3, wherein applying the reconditioning cycles of discharge and charge to the metal-hydrogen battery comprises:

applying a first current during charge operations of the reconditioning cycles of discharge and charge; and applying a second current during discharge operations of the reconditioning cycles of discharge and charge, wherein the first current is greater than the second current.

6. The method of claim 3, further comprising: conducting the reconditioning cycles of discharge and charge at a temperature above a room temperature.

7. The method of claim 1, wherein determining whether the energy efficiency of the metal-hydrogen battery during the normal cycles of discharge and charge is decayed based on the indicator comprises:

calculating a first decaying rate of a discharge voltage during discharge operations of the normal cycles of discharge and charge;

calculating a second decaying rate of a charge voltage during charge operations of the normal cycles of discharge and charge; and determining that the metal-hydrogen battery during the normal cycles of discharge and charge is decayed when the first decaying rate is greater than the second decaying rate.

8. The method of claim 1, wherein the threshold voltage is greater than 0.1 V vs. $H_2/H_2O$.

9. The method of claim 1, wherein determining whether the metal-hydrogen battery during the normal cycles of discharge and charge is decayed based on the indicator comprises:

obtaining sample cycles of discharge and charge of a plurality of first metal-hydrogen batteries, wherein the metal-hydrogen battery is one of the plurality of first metal-hydrogen batteries;

extracting first parameters of the sample cycles of discharge and charge indicating that the plurality of first metal-hydrogen batteries are decayed;

training a machine-learning model with the first parameters to generate a trained machine-learning model;

extracting second parameters of the sample cycles of discharge and charge of the metal-hydrogen battery; and feeding the second parameters to the trained machine-learning model to determining whether the metal-hydrogen battery during the normal cycles of discharge and charge is decayed.

10. The method of claim 1, further comprising: conducting the normal cycles of discharge and charge at a temperature above a room temperature.

11. The method of claim 1, wherein regenerating the metal-hydrogen battery includes increasing a cutoff voltage to a predetermined voltage during discharge operations subsequent to the normal cycles of discharge and charge.

12. A metal-hydrogen battery, comprising:

a vessel;

at least one cell comprising a cathode and an anode, the anode and the cathode each having a catalyst, the at least one cell contained within the vessel, the at least one cell supporting a hydrogen evolution reaction (HER) and a hydrogen oxidation reaction (HOR) during charge and discharge cycles;

an electrolyte contained in the vessel; and a controller coupled to the at least one cell, the controller executing instructions to monitor an indicator of degradation of the metal-hydrogen battery during normal cycles of discharge and charge;

determine whether the metal-hydrogen battery during the normal cycles of discharge and charge is decayed based on the indicator; and in response to determining that the metal-hydrogen battery during the normal cycles of discharge and charge is decayed due to anode oxidation, regenerate the metal-hydrogen battery, wherein the indicator is a potential on the anode of the metal-hydrogen battery, and wherein the metal-hydrogen battery during the normal cycles of discharge and charge is determined to be decayed when the potential on the anode of the metal-hydrogen battery is greater than a threshold voltage.

13. The metal-hydrogen battery of claim 12, wherein the metal-hydrogen battery decays during the normal cycles of discharge and charge due to anode oxidation.

14. The battery of claim 12, wherein instructions to regenerate the metal-hydrogen battery includes instructions to apply reconditioning cycles of discharge and charge to the metal-hydrogen battery, wherein the reconditioning cycles of discharge and charge utilize a discharge or charge condition different from the normal cycles of discharge and charge.

15. The battery of claim 14, wherein instructions to apply the reconditioning cycles of discharge and charge to the metal-hydrogen battery comprises:

applying a same current for a same duration during each of the reconditioning cycles of discharge and charge.

16. The battery of claim 14, wherein instructions to apply the reconditioning cycles of discharge and charge to the metal-hydrogen battery includes instructions to apply a first current during charge operations of the reconditioning cycles of discharge and charge; and apply a second current during discharge operations of the reconditioning cycles of discharge and charge, wherein the first current is greater than the second current.

17. The battery of claim 14, further comprising: instructions to conduct the reconditioning cycles of discharge and charge at a temperature above a room temperature.

18. The battery of claim 12, wherein instructions to determine the metal-hydrogen battery during the normal cycles of discharge and charge is decayed based on the indicator comprises instructions to:

calculate a first decaying rate of a discharge voltage during discharge operations of the normal cycles of discharge and charge;

calculate a second decaying rate of a charge voltage during charge operations of the normal cycles of discharge and charge; and determine that the energy efficiency of the metal-hydrogen battery during the normal cycles of discharge and charge is decayed when the first decaying rate is greater than the second decaying rate.

19. The battery of claim 12, wherein the threshold voltage is greater than 0.1 V vs. $H_2/H_2O$.

20. The battery of claim 12, wherein instructions to determine whether the metal-hydrogen battery during the normal cycles of discharge and charge is decayed based on the indicator includes instructions to obtain sample cycles of discharge and charge of a plurality of first metal-hydrogen batteries, wherein the metal-hydrogen battery is one of the plurality of first metal-hydrogen batteries;

extract first parameters of the sample cycles of discharge and charge indicating that the plurality of first metal-hydrogen batteries are decayed;

train a machine-learning model with the first parameters to generate a trained machine-learning model;

extract second parameters of the sample cycles of discharge and charge of the metal-hydrogen battery; and feed the second parameters to the trained machine-learning model to determining whether the metal-hydrogen battery during the normal cycles of discharge and charge is decayed due to anode oxidation.

21. The battery of claim 12, further comprising: instructions to conduct the normal cycles of discharge and charge at a temperature above a room temperature.

22. The battery of claim 12, wherein instructions to regenerate the metal-hydrogen battery includes instructions to increase a cutoff voltage to a predetermined voltage during discharge operations subsequent to the normal cycles of discharge and charge.

* * * * *